Dec. 30, 1952 H. L. GERWIN ET AL 2,624,043

VISUAL COMMUNICATION SYSTEM

Filed Jan. 23, 1946 3 Sheets-Sheet 1

INVENTORS
HARRY L. GERWIN
HOMER A. HUMISTON
BY
M. O. Hayes
ATTORNEY

VISUAL COMMUNICATION SYSTEM

Filed Jan. 23, 1946 3 Sheets-Sheet 2

INVENTORS
HARRY L. GERWIN
HOMER A. HUMISTON
BY M. A. Hayes
ATTORNEY

VISUAL COMMUNICATION SYSTEM

INVENTORS
HARRY L. GERWIN
HOMER A. HUMISTON
BY M. A. Hayes
ATTORNEY

Patented Dec. 30, 1952

2,624,043

UNITED STATES PATENT OFFICE 2,624,043

VISUAL COMMUNICATION SYSTEM

Harry L. Gerwin and Homer A. Humiston,
Washington, D. C.

Application January 23, 1946, Serial No. 642,955

9 Claims. (Cl. 343—5)

Figure 1:
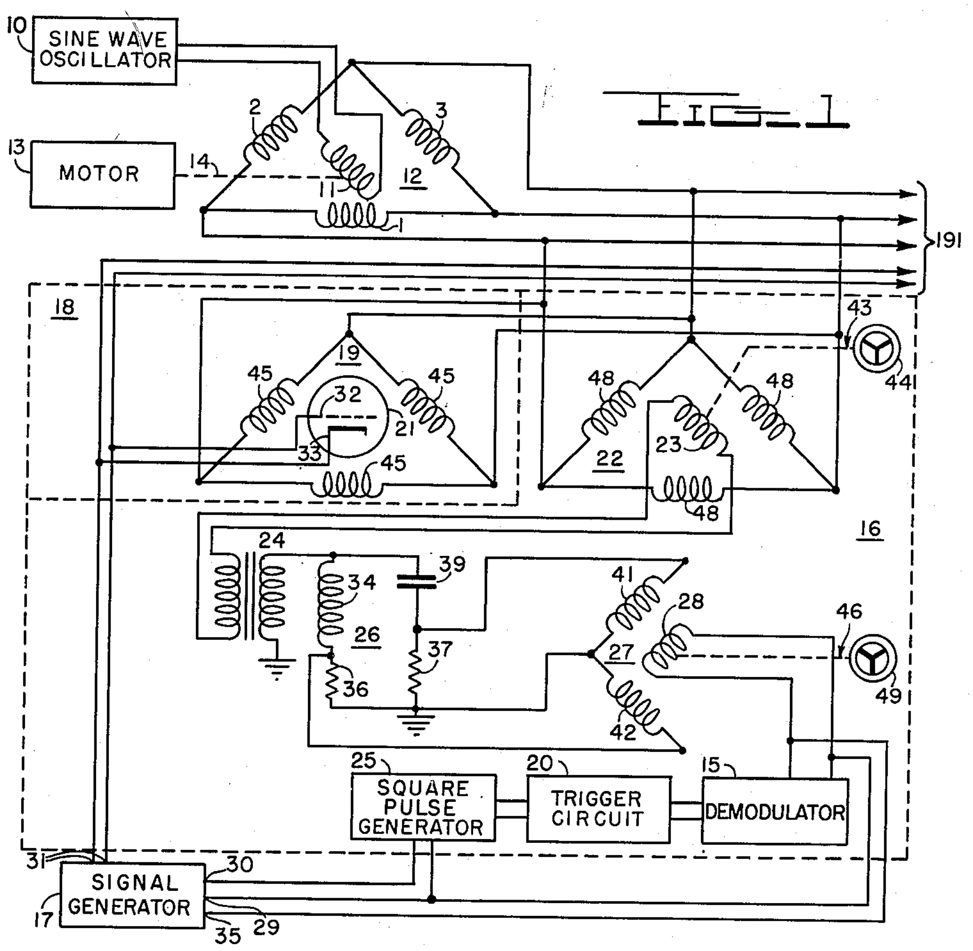

(Granted under the act of March 3, 1883, as amended April 30, 1928; 370 O. G. 757)

The invention relates to systems utilizing cathode ray tubes and more particularly to means for positioning distinctive luminous marks at desired points on the fluorescent screens of said tubes.

One object of the invention is to provide a visual information distribution system wherein luminous marks may be selectively positioned in two coordinates on the screens of a plurality of cathode ray tube screens.

Another object of the invention is to provide means for positioning a distinctive luminous mark on the indicators of an obstacle detection system at a desired range and bearing.

A further object of the invention is to cause said luminous marks to appear at the desired position twice during each revolution of a rotatable member.

Other objects and features of the invention will appear more fully from the following description when considered in connection with the accompanying drawings. It is to be expressly understood, however, that the drawings are designed for purposes of illustration only and not as a definition of the limits of the invention, reference for the latter purpose being had to the appended claims.

Figure 2:
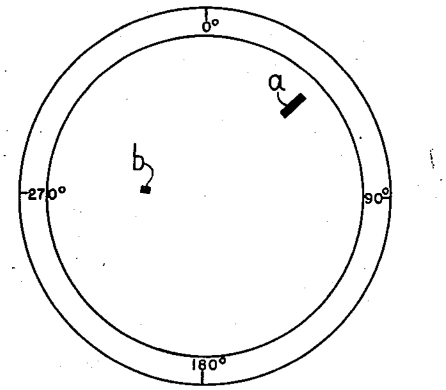
Figures 3, 5:
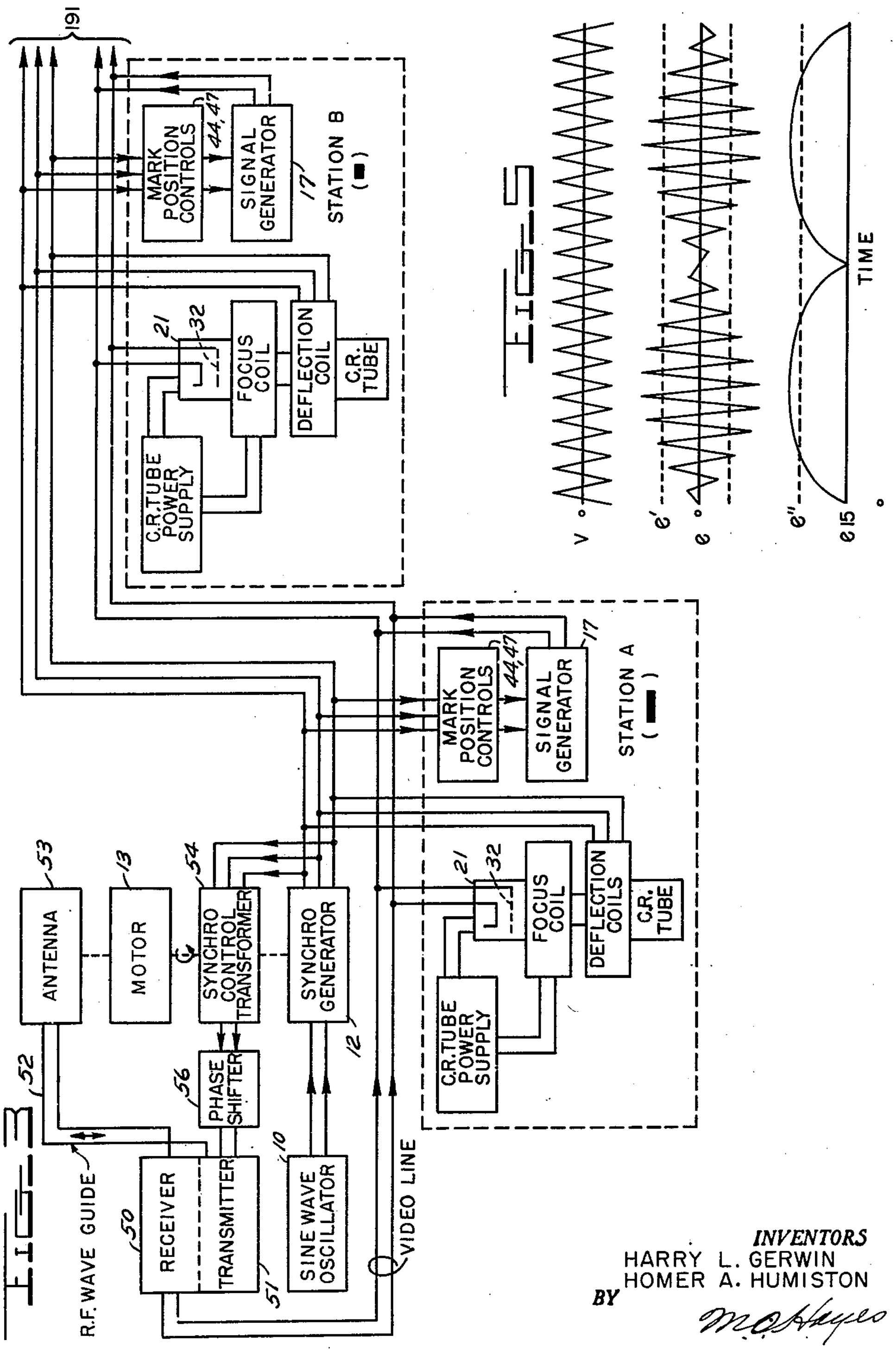
Figure 4:
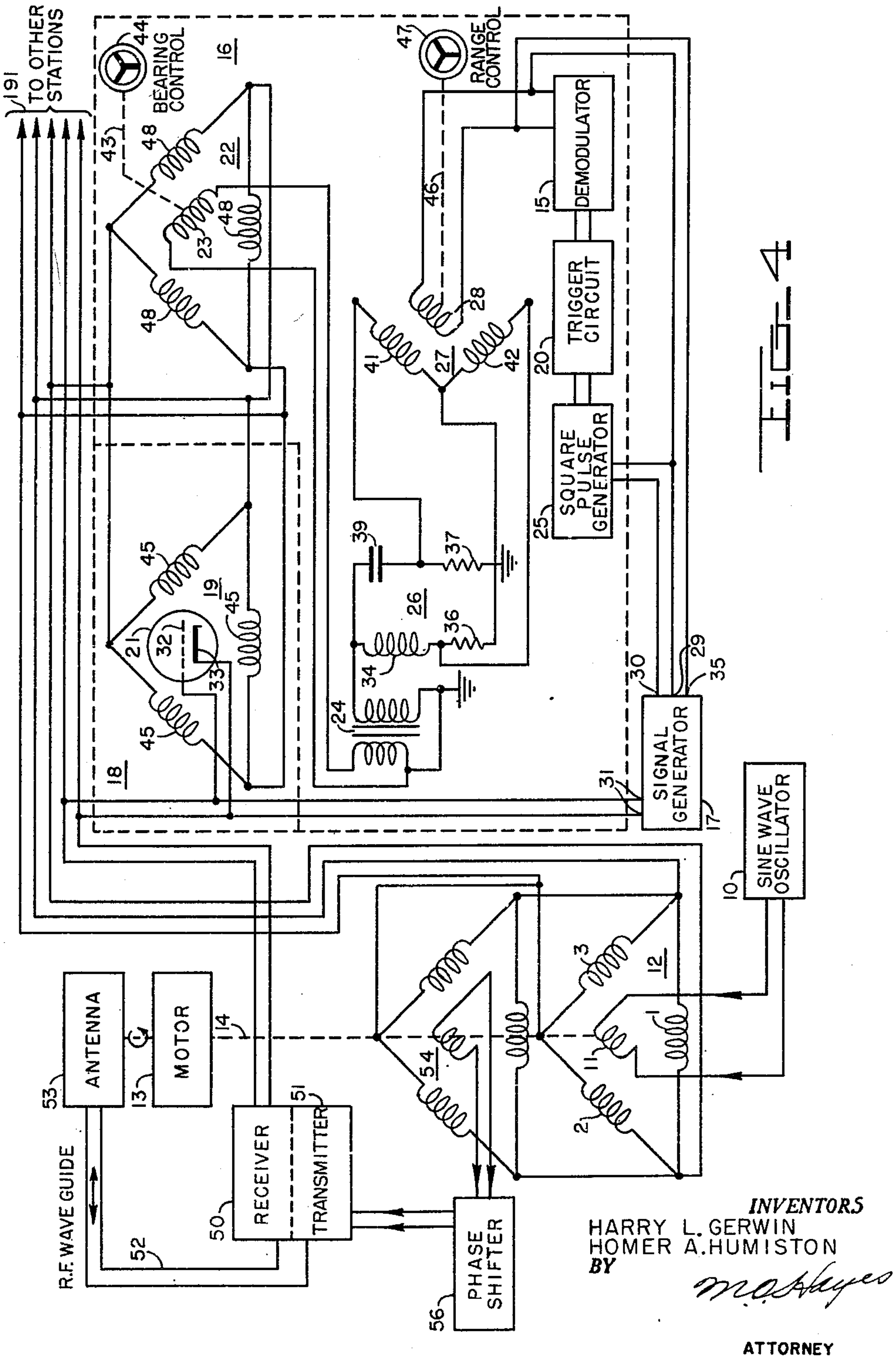

In the drawings, wherein similar reference characters denote similar parts throughout the several views:

Fig. 1 is a partial schematic diagram of a visual information distribution system incorporating the invention, Fig. 2 is representative of the form of visual information displayed on the screen of a cathode ray tube in a system incorporating the invention, Fig. 3 is a block diagram of an obstacle detection system incorporating the invention, Fig. 4 is a partial schematic diagram of an obstacle detection system incorporating the invention, and Fig. 5 illustrates voltage wave forms at certain points in explanation of the operation of the invention.

In the system of Fig. 1, a cathode ray is swept in a rotating radial locus by a magnetic field. Reference indications are applied to the screen of a cathode ray tube 21 at a desired radial distance and a selected angular position. This is accomplished in the embodiment shown by intensity modulation of the cathode ray. The cathode ray control means is responsive at a particular voltage value to an amplitude modulated signal. This signal is obtained from a field similar to the cathode ray sweep field but is separately controlled as to the amplitude modulation phase and the oscillation phase.

Thus, in Fig. 1 of the drawings, a visual information distribution system is disclosed comprising a sine wave oscillator 10 the output terminals of which are connected to the rotor coil 11 of a synchro generator 12 which is rotatable by a motor 13 through a shaft connection 14, a mark position control unit 16 comprising a demodulator 15, a trigger circuit 20, and a square pulse generator 25; a signal generator 17, an indicator unit 18 and terminals 191 for the connection of additional stations into the system, each additional station comprising units identical to units 16, 17 and 18. The indicator unit 18 includes a synchro motor 19 the rotor of which has been replaced by the throat section of an electromagnetic deflection type of cathode ray tube 21. The stator terminals of the synchro motor 19 are connected to the corresponding terminals of the synchro generator 12. The mark position control unit 16 includes a synchro control transformer 22 the stator terminals of which are connected to the corresponding terminals of synchro generator 12 and the rotor coil 23 of which is connected through an impedance matching transformer 24 and a phase-splitting network 26 to the stator coils 41, 42 of a magnetic phase shifter 27. The rotor coil 28 of the phase shifter is connected to the demodulator 15 and to input terminals 29, 35 of the signal generator 17. The demodulator 15 is connected through a trigger circuit 20, which may be of the Eccles-Jordan type, and a square pulse generator 25 to input terminals 29, 30 of the signal generator 17. The output terminals 31 of the signal generator are connected to the control grid 32 and cathode 33 of the cathode ray tube 21 and to the corresponding points in other stations (not shown) which may be connected to terminals 191.

The operation of the system of Fig. 1 will now be considered. The motor 13 drives the rotor coil 11 of the synchro generator 12 at a relatively slow speed, for example: one revolution per second. The sine wave oscillator 10 supplies a sinusoidal voltage of relatively higher frequency, 1800 cycles per second, for example, to the rotor coil 11 of the synchro generator 12. This voltage is given by the equation:

$$v = V_{\cos}(wt + \phi)$$

where V is the maximum amplitude of the sine wave, $w$ is $2\pi$ times the frequency, $t$ is time, and and $\phi$ is an arbitrary phase angle. This voltage, when applied to the synchro generator rotor 11 produces three output voltages which are amplitude modulated at the rate of rotation of the rotor 11 of the synchro generator 12. The phases of the modulation of the three output voltages differ by 120 degrees from each other. Writing the angular position of the rotor as:

$$\theta=(\alpha t+p)$$

where $p$ is an arbitrary constant and $\alpha$ is the rate of rotation; the respective output voltages of the three synchro stator coils 1, 2, 3 then assume the form:

$$v_1=kV(\cos \alpha t)(\cos wt)$$

$$v_2=kV\left(\cos \alpha t-\frac{2\pi}{3}\right)(\cos wt)$$

$$v_3=kV\left(\cos \alpha t-\frac{4\pi}{3}\right)(\cos wt)$$

where $k$ is the ratio of the rotor to stator windings and after making an appropriate change in the point of zero time so as to eliminate arbitrary constants. The voltages $v_1$, $v_2$, and $v_3$ are applied to the corresponding windings 45 of synchro motor 19 and windings 48 of synchro control transformer 22. The resultant magnetic field produced by the stator windings 45 of synchro motor 19 oscillates at a phase velocity $w$ with the direction of oscillation rotating at a rate $\alpha$. This magnetic field causes a corresponding deflection of the electron beam across the screen of the cathode ray tube. That is, the beam sweeps across the screen with simple harmonic motion at the frequency of the sine wave oscillator and the direction of the sweep rotates in synchronism with the rotor coil 11 of the synchro generator 12. However, the intensity of the electron beam is adjusted by known means so that it is just below a threshold magnitude which will produce fluorescence of the screen. The maximum amplitude of the beam deflection may be much greater than the screen radius so that the beam traverses the screen at an approximately constant speed.

That is, the rate of displacement of the beam is substantially constant over a small fraction of the maximum displacement. A similar rotating and oscillating magnetic field is produced by the stator windings of synchro control transformer 22. The voltage across its rotor terminals is then:

$$e=k'V\cos(\alpha t-\gamma)\cos wt$$

where $\gamma$ is the angular position of the rotor measured from the point where $e$ and $v_1$ are in phase, and $k'$ is an arbitrary amplitude constant. In this equation $\alpha \ll w$, so that it is possible to regard the factor $(\alpha t-\gamma)$ as an operator which modulates the amplitude of the function cosinusoidally, and which has the following effect on the phase of the function:

When $-90° \leqq (\alpha t-\gamma) \leqq +90°$, the operator causes 0° phase shift.

When $90° \leqq (\alpha t-\gamma) \leqq 270°$, the operator causes 180° phase shift.

This phase shift is illustrated by the wave forms of $v$ and $e$ in Fig. 5, wherein $\gamma$ is assumed to be $-90°$ when $\alpha t$ is equal to zero. For convenience in drafting, the wave shape of voltage $v$ is depicted as triangular; however it is actually a sine wave of much higher frequency than is shown.

The voltage $e$ is applied to a phase-splitting network 26 which may comprise inductor 34, capacitor 39 and resistance 36, 37. The purpose of the phase-splitting network 26 is to impress on the two stator coils 41, 42 of the phase shifter 27 voltages which will have exactly 90 electrical degrees displacement between them. The resistance 37 is made equal to the reactance of capacitor 39, at the frequency of the sine wave oscillator so that the voltage applied to the stator coil 41 is given by the following:

$$k''V\cos(\alpha t-\gamma)\cos\left(wt-\frac{\pi}{4}\right)$$

where $k$ is an arbitrary amplitude constant. Similarly, the reactance of inductor 34 is made equal to the resistance 36 so that the voltage applied to the stator coil 42 is given by the following:

$$k''V\cos(\alpha t-\gamma)\cos\left(wt+\frac{\pi}{4}\right)$$

That is, the stator 41 voltage leads the applied voltage by a phase angle of 45 degrees and the stator 42 voltage lags the applied voltage by 45 degrees so that the respective voltage applied to the two stator coils 41 and 42 are in phase quadrature and comprise a two-phase voltage.

The phase shifter 27 consists of a rotor coil and two pairs of stator coils. The stator coils are arranged exactly at right angles to each other. The phase shifter is so built that the mutual inductance between each stator coil and the rotor coil is proportional to a sinusoidal function of the angle that the axis of the rotor coil 28 makes with the axis of the stator coil. The two-phase voltage impressed on the stator coils 41, 42 induces in the rotor coil 28 two voltages. The resultant voltage in the rotor is the vector sum of these two voltages and may be expressed as:

$$k'''V\cos(\alpha t-\gamma)\cos(wt-B)$$

where B is the angular position of the rotor 28 and $k'''$ is an arbitrary amplitude constant. That is, the output of the phase shifter is subject to a change of phase of the lower frequency component by varying $\gamma$, the angular position of the synchro control transformer rotor coil 23; and the higher frequency component is subject to a change in phase by varying the angular position B, of the phase shifter rotor coil 28.

The output voltage $e$15, Fig. 5, of the demodulator actuates the trigger circuit 20 to produce positive increments of output voltage from the trigger circuit twice during each revolution of the synchro generator rotor 11. These positive increments occur when the voltage $e$15 has a certain magnitude $e''$ and thus correspond to positions of the synchro generator rotor 11 which are 180 degrees apart, and are applied to the square pulse generator 25 which responds by producing short square pulses of a duration of the order of, but greater than, the period of sine wave voltage $v$. The square output pulses from the square pulse generator are applied to the signal generator 17 input terminals 29, 35 in such manner as to form a pedestal which enables the mark generator 17 to operate when the voltage $e$ reaches a certain magnitude $e'$.

The signal generator 17 functions under the conditions just described to produce a signal consisting of voltage pulses or groups of pulses, which may have distinctive characteristics of duration, and which are applied to the control grid 32 and cathode 33 of the cathode ray tube 21 to intensify the electron beam sufficiently to cause luminous marks to appear on the screen in accordance with said signal.

A suitable embodiment of signal generator generator 17 described in the copending application of H. L. Gerwin, Serial No. 608,816, filed August 3, 1945, entitled "Signal Generator," now Patent No. 2,415,093.

From the foregoing description it will be understood that the phase of the low frequency component of voltage *e* determines the times during which it is possible for the signal generator 17 to function. Also, the phase of the lower frequency component is adjustable according to the angular position of the rotor coil 23 of synchro control transformer 22. In addition, the direction of the radial sweep of the electron beam has been shown to rotate in accordance with the lower frequency component of voltage *e*. Consequently, the angular position of rotor coil 23 determines the direction of the sweep at which the signal generator 17 can function, thus determining the angular position of the luminous marks with respect to a reference radius line of the sweep. Similarly, the phase of the higher frequency component of voltage *e* determines the exact time that the mark generator will function, thus determining the distance of the marks from the center of rotation of the sweep.

Since it has been shown that the higher frequency component of voltage *e* is reversed in phase, or shifted 180 degrees, during each 180 degrees of rotation of the sweep, it will be understood that the marks appear on the screen of the cathode ray tube at the same point twice during each revolution of the sweep.

The angular position of the marks on the screen of the cathode ray tube may be adjusted by effecting an angular displacement of rotor coil 23 of synchro control transformer 22 by mechanical rotation of a shaft 43 connected to a control device such as a handwheel 44. The radial distance of the marks from the center of rotation of the sweep may be adjusted by effecting an angular displacement of rotor coil 28 of phase shifter 27 by mechanical rotation of a shaft 46 connected to a control device such as handwheel 47. The diagram of Fig. 2 depicts the appearance of the marks on the screen of the cathode ray tubes in a system of the type shown in Fig. 1 which has two stations, each producing a distinctive luminous mark, *a*, *b*.

Referring now to Fig. 3, there is shown in block form a diagram of an obstacle detection system incorporating the invention, in which the obstacle indications and the marks appear together on the screens of the cathode ray tubes.

The operation of the system of Fig. 3 will be explained with reference to Fig. 4 which is a partial schematic diagram of the system shown in Fig. 3. The members of the system comprise, in addition to those already mentioned, an ultra high frequency receiver 50, an ultra high frequency transmitter 51, a radio frequency wave guide 52, a directional antenna 53, a synchro control transformer 54, and a phase shifter 56. The antenna 53 and the rotor coil of a synchro control transformer 54 are mounted on the shaft 14 which is rotated by motor 13. The terminals of the stator windings of synchro control transformer 54 are connected to the corresponding terminals of the synchro generator 12. Consequently, as the shaft 14 rotates the voltage induced in the rotor coil of synchro control transformer 54 is a constant amplitude sine wave of the same frequency as that of the sine wave oscillator 10. The voltage at the terminals of the rotor coil of synchro control transformer 54 is applied through a phase shifter 56 to the transmitter 51 causing the transmitter to produce a short pulse of radio frequency energy once during each cycle of the sine wave voltage *v*. The phase shifter is adjusted so as to cause the transmitted pulse to occur as the electron beams of the cathode ray tubes pass the center of rotation. The receiver 50 then becomes operative for a certain time interval and produces video voltage pulses in response to reflected energy received from obstacles in the field of the antenna 53. The video voltage pulse output of the receiver is is also applied to the control grids 32 of the cathode ray tubes 21. Thus, obstacles are indicated on the screens of the cathode ray tubes 21 as luminous areas at a distance from the center of rotation of the sweep which is a function of the range of the obstacle and at an angular position corresponding to the direction of the obstacle. The operation of the mark position control arrangement is the same as hereinbefore described with reference to Fig. 1.

Consequently, the system of Figs. 2 and 3 provides a plan position indication of detected obstacles and superimposed marks which may be moved about on the screen as desired. For instance, in Fig. 3, station A may direct the attention of station B to a particular obstacle indication by moving its distinctive marker *a* to coincide with said obstacle indication.

Since the antenna 53 rotates relatively slowly, the system provides an additional advantage in that the marks appear twice during each revolution of the antenna.

It will be understood that the invention is not limited by the embodiments herein described and that the scope of the invention is to be determined from the appended claims.

The invention described herein may be manufactured and used by or for the Government of the United States of America for governmental purposes without the payment of any royalties thereon or therefor.

What is claimed is:

1. In combination, means operative to generate an oscillating rotating magnetic field, means responsive thereto operative to supply an oscillating signal amplitude modulated at the frequency of field rotation, first signal control means operative to shift the amplitude modulation phase, second signal control means operative to shift the oscillating signal phase, a cathode-ray tube, means for sweeping the cathode ray through a rotating radial locus at the field frequencies, and control means for the cathode ray operative responsively to the oscillating signal to provide a reference indication.

2. In combination, means for generating a pair of oscillating rotating magnetic fields, means responsive to one of said fields to generate an oscillating signal amplitude modulated at the frequency of field rotation, first signal control means operative to shift the amplitude modulation phase, second signal control means operative to shift the oscillating signal phase, a cathode-ray tube, means responsive to the other of said fields to sweep the cathode ray in a rotating radial locus at the field frequencies, and control means for the cathode ray operative responsively to the oscillating signal to provide a reference indication.

3. In combination, synchro generator means for generating a plurality of oscillating electric currents of progressive varying amplitude, means responsive to the currents for generating a pair of oscillating rotating magnetic fields, means responsive to one of said fields to generate an oscillating signal amplitude modulated at the frequency of field rotation, first signal control means operative to shift the amplitude modulation phase, second signal control means operative to shift the oscillating signal phase, a cathode-ray tube, means responsive to the other of said fields to sweep the cathode ray at the field frequencies, and control means for the cathode ray operative responsively to the oscillating signal to provide a reference indication.

4. In combination, means operative to generate an oscillating rotating magnetic field, means responsive thereto operative to supply an oscillating signal amplitude modulated at the frequency of field rotation, first signal control means operative to shift the amplitude modulation phase, second signal control means operative to shift the oscillating signal phase, a cathode-ray tube, means for sweeping the cathode ray through a rotating radial locus at the field frequencies, and control means for the cathode ray operative responsively to the oscillating signal to provide a reference indication, a radio pulse echo direction finding and ranging apparatus comprising a pulse transmitter and receiver, means for synchronizing transmission of pulses with the oscillations of said field, and means for applying received echo pulses to said cathode ray control means.

5. In combination, means for generating a pair of oscillating rotating magnetic fields, means responsive to one of said fields to generate an oscillating signal amplitude modulated at the frequency of field rotation, first signal control means operative to shift the amplitude modulation phase, second signal control means operative to shift the oscillating signal phase, a cathode-ray tube, means responsive to the other of said fields to sweep the cathode ray in a rotating radial locus at the field frequencies, control means for the cathode ray operative responsively to the oscillating signal to provide a reference indication, a radio pulse direction finding and ranging apparatus comprising a pulse transmitter and receiver, means for synchronizing transmission of pulses with the oscillations of said field, and means for applying received echo pulses to said cathode ray control means whereby visual indications of the position of remote objects are presented on the screen of the cathode ray tube together with said reference indication.

6. In combination, means operative to generate an oscillating rotating magnetic field, means responsive thereto operative to supply an oscillating signal amplitude modulated at the frequency of field rotation, signal control means operative to shift the amplitude modulation phase, a cathode-ray tube, means for sweeping the cathode ray through a rotating radial locus at the field frequencies, and control means for the cathode ray operative responsively to the oscillating signal to provide a reference indication.

7. In combination, means operative to generate an oscillating rotating magnetic field, means responsive thereto operative to supply an oscillating signal amplitude modulated at the frequency of field rotation, said signal consisting of side band frequencies corresponding to the sum and difference of the frequencies of oscillation and rotation of said field, whereby the phase of the resultant oscillating signal is inverted at each half-period of the rotation of said field, signal control means operative to shift the oscillating signal phase, a cathode-ray tube, means for sweeping the cathode ray through a rotating radial locus at the field frequencies, and control means for the cathode ray operative responsively to the oscillating signal to provide a reference indication.

8. In combination, means operative to generate an oscillating rotating magnetic field, means operative to supply an oscillating signal amplitude modulated at the frequency of field rotation, said signal consisting of two side bands corresponding respectively to the sum and difference of the frequencies of oscillation and of rotation of said field, whereby the phase of the oscillating signal is inverted at each half-period of the rotation of said field, first signal control means operative to shift the oscillating signal phase, second signal control means operative to shift the amplitude modulation phase, a cathode-ray tube, means for sweeping the cathode ray through a rotating radial locus at the field frequencies, and control means for the cathode ray operative responsively to the modulated oscillating signal to provide a reference indication.

9. In combination, means operative to generate an oscillating rotating magnetic field, means responsive thereto operative to supply an oscillating signal amplitude modulated at the frequency of field rotation, first signal control means operative to shift the amplitude modulation phase, second signal control means operative to shift the oscillating signal phase, an indicator device operative to display a two coordinate sweep showing, indicator sweep means synchronized with the oscillating rotating fields, and control means for the indicator operative responsively to the oscillating signal from said first and second signal control means to provide a reference indication.

HARRY L. GERWIN.
HOMER A. HUMISTON.

REFERENCES CITED

The following references are of record in the file of this patent:

UNITED STATES PATENTS

| Number | Name | Date |
|---|---|---|
| 2,400,791 | Tolson et al. | May 21, 1946 |
| 2,405,239 | Seeley | Aug. 6, 1946 |
| 2,409,456 | Tolson et al. | Oct. 15, 1946 |
| 2,419,239 | White | Apr. 22, 1947 |
| 2,419,999 | Leck | May 6, 1947 |